G. E. LOB.
PNEUMATIC CONVEYER.
APPLICATION FILED FEB. 14, 1916.

1,280,780.

Patented Oct. 8, 1918.
7 SHEETS—SHEET 3.

Inventor
Guido E. Lob
By Brown Hanson Boettcher
Attys.

G. E. LOB.
PNEUMATIC CONVEYER.
APPLICATION FILED FEB. 14, 1916.

1,280,780.

Patented Oct. 8, 1918.
7 SHEETS—SHEET 4.

Inventor
Guido E. Lob
By Brown Hansen & Bottcher,
Attys.

G. E. LOB.
PNEUMATIC CONVEYER.
APPLICATION FILED FEB. 14, 1916.

1,280,780.

Patented Oct. 8, 1918.
7 SHEETS—SHEET 7.

UNITED STATES PATENT OFFICE.

GUIDO E. LOB, OF CHICAGO, ILLINOIS, ASSIGNOR TO PNEUMATIC CONVEYOR COMPANY, OF CHICAGO, ILLINOIS, A CORPORATION OF ILLINOIS.

PNEUMATIC CONVEYER.

1,280,780.

Specification of Letters Patent.

Patented Oct. 8, 1918.

Application filed February 14, 1916. Serial No. 78,131.

*To all whom it may concern:*

Be it known that I, GUIDO E. LOB, a citizen of the United States, residing at Chicago, in the county of Cook and State of Illinois, have invented a certain new and useful Improvement in Pneumatic Conveyers, of which the following is a full, clear, concise, and exact description, reference being had to the accompanying drawings, forming a part of this specification.

My invention relates to pneumatic conveyers and more particularly aims to provide a novel method of and means for conveying loose or pulverulent or granulated material in large quantities.

I shall explain my invention with the aid of the accompanying drawings which form a part of the present specification.

My system, though it is a suction system, is not to be confused with the vacuum systems heretofore known, but is to be considered as a velocity system in which the velocity of the air, as distinguished from the pressure of the air, is employed for moving the grain in the conveying pipes. That is to say, my system depends upon velocity generated by suction as distinguished from pressure generated by suction in the prior systems.

I desire to make it clear that my system of conveying does not involve pumping the material along, but consists in drawing a strong current of air moving at such a high velocity as to wash the grain along and hold the same in suspension. The velocity of the moving air must be relatively high in order to carry the grain along in suspension or practically in suspension.

Figures 1, 2, 3:
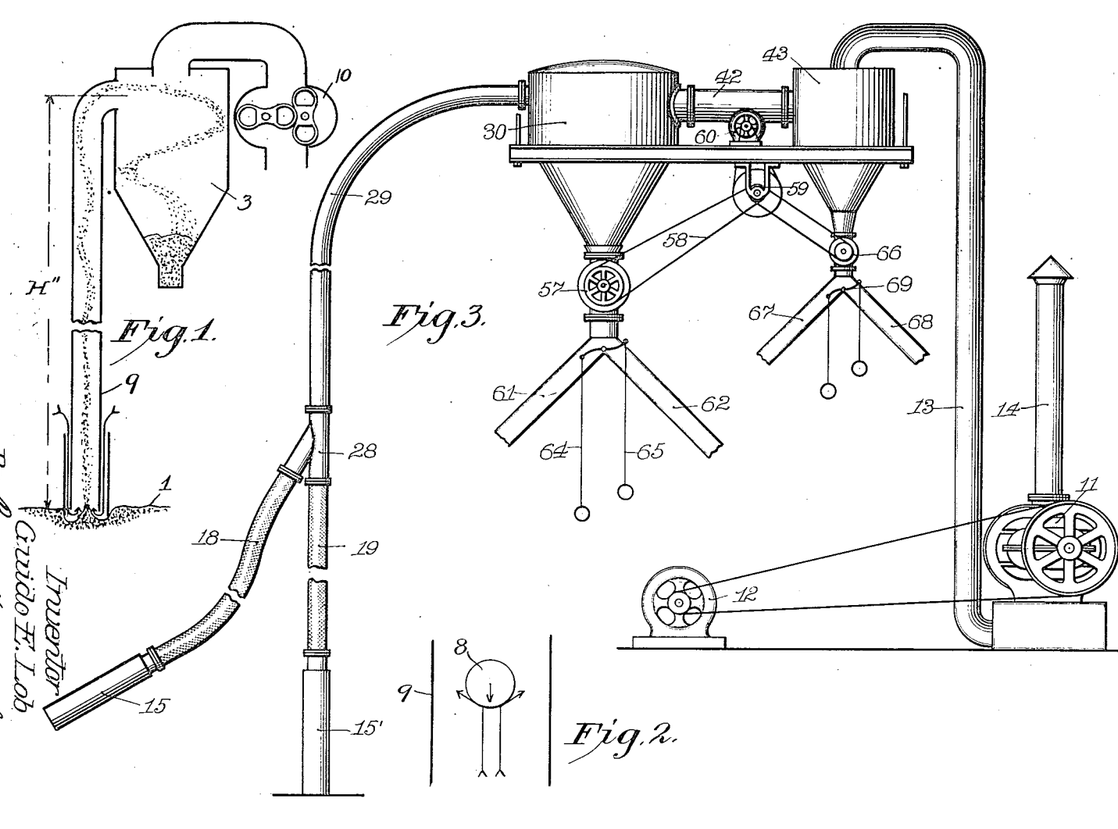
Figure 1 is a diagram illustrating the method of operation of a conveyer embodying my invention.
Fig. 2 is an explanatory diagram.
Fig. 3 is a diagrammatic layout of a conveyer system employing my invention.

This distinction can best be pointed out with the aid of the diagram shown in Fig. 2. In prior systems known to me the pressure of the air upon the lowermost particle in the conveying tube must be great enough to sustain the weight of all the superposed particles. In Fig. 2 I have shown the manner in which a particle 8 is carried along in the conveying tube 9 in accordance with my invention. Pressure, as such, does not enter into the operation of the device. The air is moved with great velocity through the tube 9 and a particle such as 8 is supported by the velocity of the air itself. That is to say the air particles striking the lower surface of the particle 8 impart a certain amount of their energy of impact to this particle tending to move it along at a lesser rate than themselves. In this way the particle 8 is moved along at a very rapid rate as compared with the operation of the particles moved by pressure, but at a less velocity than the particles of air flowing in the tube 9.

Inasmuch as the particle 8 does not rub against the side walls 9 nor against adjacent particles, the passage through the tube is made with very small loss due to internal friction or to friction with the side walls.

It can be seen that a larger conveying tube 9 is necessary for conveying a given amount of grain if the same rate of travel be assumed, since it is necessary, not only to move the grain but also to move the diluting air.

For the purpose of generating the large and rapid flow of air which amounts, in effect, to a miniature tornado, I employ a rotary blower 10, as shown in Fig. 1, which is capable of moving the large volume of air required for the operation of my system. This type of air pump is particularly adapted to moving large quantities of air or other fluids at low pressure and is not unfavorably affected by considerable amounts of dust in the air.

By employing the tornado effect, that is, a large quantity of air running through the pipe at a high velocity, I am enabled to secure a very great vertical lift as compared with the previously known systems.

By employing large quantities of air and moving the same by suction through the conducting pipe at a rapid rate, the material will be washed along with the air current and when the material is once in motion, the momentum thereof will permit it to be moved forward very freely. The amount of material that will be washed along with a given amount of air at a given velocity depends upon the specific gravity of the material. In other words, the lighter the material, the higher the air can be saturated with it, and the heavier the material the lower will be the point of saturation, thus instead of approaching the condition of pumping a thick, viscous liquid having great internal and external friction, this scheme of conveying approaches merely the pumping of air which contains particles which are moved along as is dust in the breeze. It is obvious that less power is required and that more satisfactory operation is possible.

Figures 8, 9:
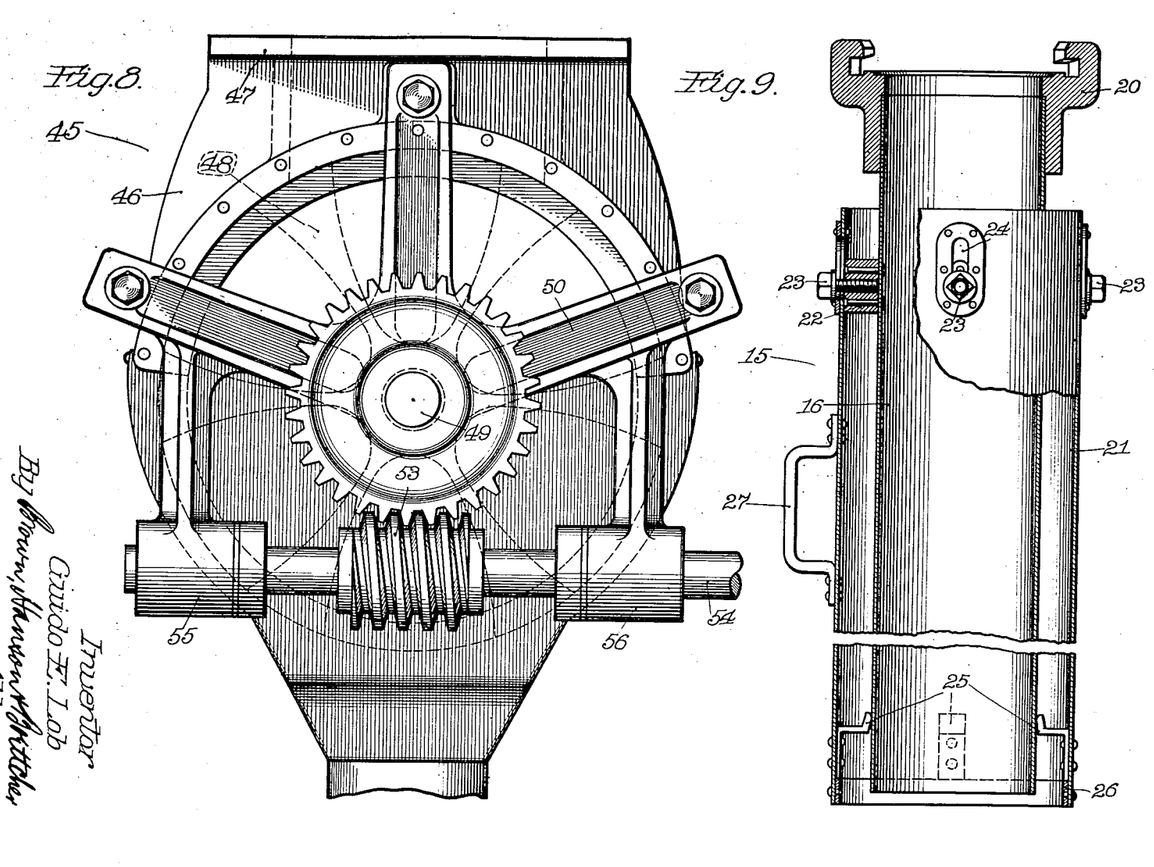
Fig. 8 is an elevational view of the same.
Fig. 9 is a fragmentary elevational view of the suction nozzle.
Figure 10:
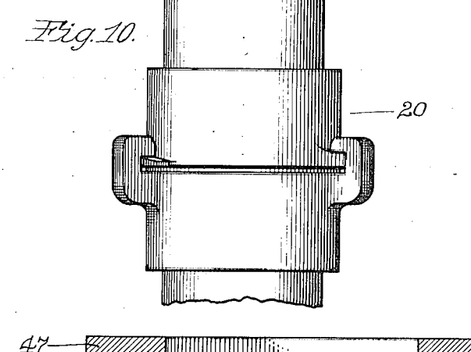
Fig. 10 is an elevational view of the joint for connecting the nozzle to the main.

In Fig. 3 I have illustrated diagrammatically the chain of elements employed in a typical installation constructed in accordance with my invention. The rotary or positive blower 11 which is driven by an electric motor 12 or other suitable source of power draws air through the suction pipe 13 and exhausts the air through the exhaust pipe 14. The rotary blower 11 is of the well known type in which a pair of impellers are rotated just out of contact with each other and with the casing of the machine, and which are adapted for pressure running from 8 ounces up to about 10 pounds per square inch. The air and grain are drawn in through the nozzles 15 and 15′, the construction of which is shown more particularly in Fig. 9. Each nozzle consists of an inner tube 16 which is joined to the conveying pipes 18 or 19 by means of the bayonet coupling 20. This coupling preserves a tight joint but presents a smooth surface upon the interior thereof flush with the interior of the inner tube 16. The inner tube is surrounded by an outer shell or tube 21, the lower ends of which extend beyond the open end of the inner tube 16. The outer shell 21 is adjustable about the inner tube 16 in order to proportion the relative quantities of air and grain or the like material, which are drawn into the conveying pipe. For this purpose the inner shell 16 is provided with a number of spacing blocks 22 which are riveted thereto for receiving the clamping bolts 23 which lie in slots 24 in the side overlying the spacing blocks 22. The lower end of the outer shell 21 has a number of guiding fingers 25 secured thereto at symmetrical points in order to space the lower ends of the inner and outer shell. These fingers 25 are riveted to the outer shell, as shown in Fig. 9. The lower edge of the outer shell 21 is reinforced by a strap or ring 26 to prevent mutilation of the edge of the same. A suitable handle 27 is provided for proper manipulation of the nozzle. The spacing blocks 22, the clamp 20 and the outer shell 21 are preferably made of aluminum in order to make the nozzle as light as possible. The pipes 18 and 19 are preferably provided with flexible portions or made flexible throughout their length in order to facilitate proper disposition and manipulation of the nozzles. The pipes 18 and 19 are joined by means of a suitable manifold 28 to the conveyer main 29 which leads into the separating chamber 30. The separating chamber 30 is made large in order to decrease the velocity of the air therethrough in order to give the material an opportunity to descend out of the current of the air.

Figure 5:
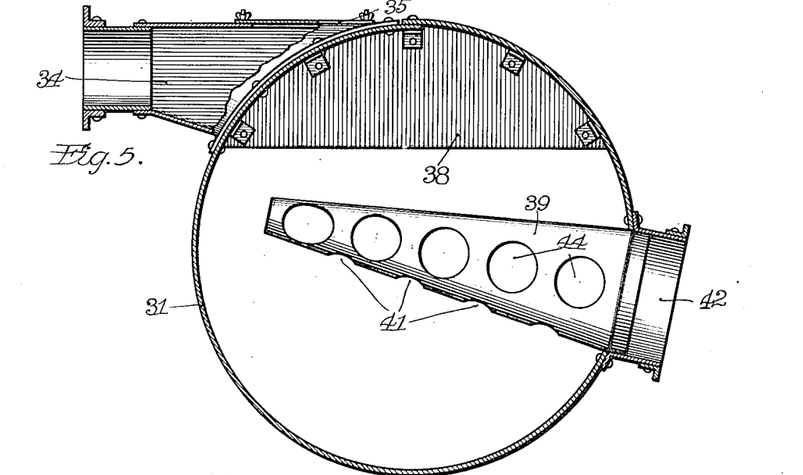
Fig. 5 is a horizontal cross section of the grain separating chamber.
Figure 6:
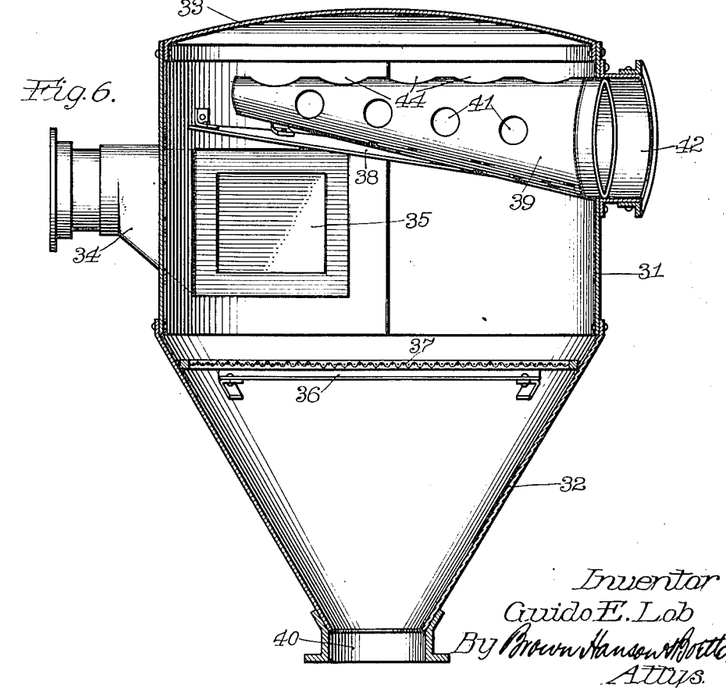
Fig. 6 is a vertical section of the same.
Figure 7:
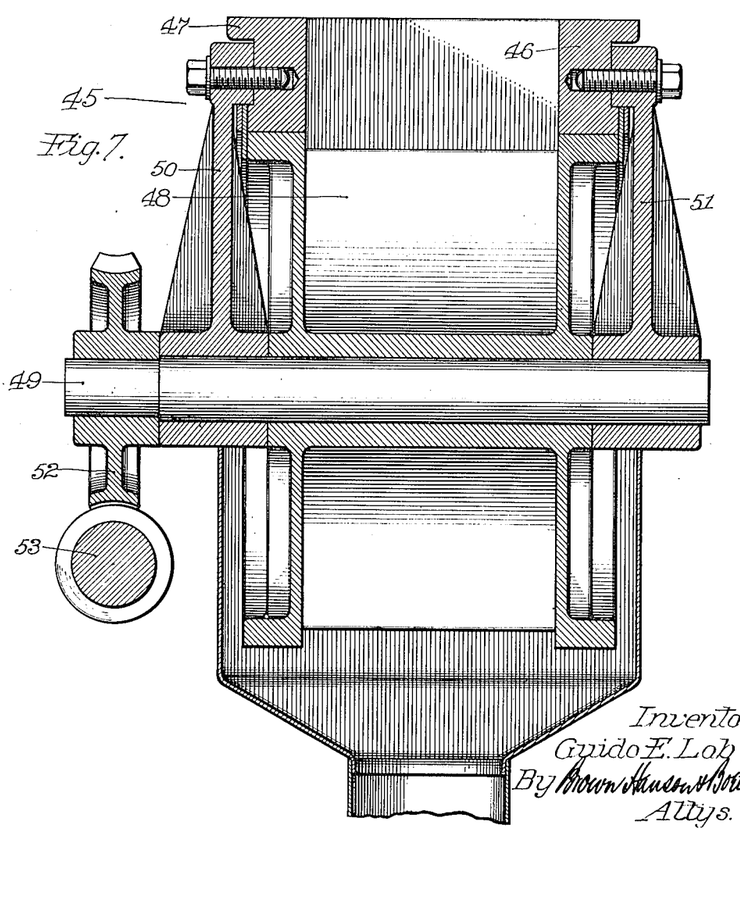
Fig. 7 is a vertical cross section of the feeder or air lock.

The structure of the settling chamber 30 is shown in Figs. 5 and 6 and consists of an outer cylindrical shell 31 which is joined at its lower edge to a conical portion 32 and is closed at its upper edge by the top or cover 33. The conveyer main 29 is joined to the settling chamber 30 by means of a tangent portion 34 which leads the grain as smoothly as possible against the side walls of the settling chamber 31 to give the same a spiral motion in order to separate the air and grain by centrifugal action. The tangential portion 34 is provided with a manhole opening which is closed by the cover 35. The conical portion 32 of the settling chamber is provided with a sectional screen supporting bracket 36 for supporting a coarse screen 37. The grain passes through this screen, but any object which would tend to jam the mechanism will be retained upon the screen and may be removed through the manhole 35. The settling chamber 30 is provided with a baffle 38 which extends from a point above the tangential intake 34 to a point below the outlet nozzle 39 so that the grain which tends to scatter upon striking the side wall 31 of the settling chamber 30 will be deflected downward and will pass through the screen to the grain outlet 40 at the bottom of the conical portion 32. The side of the outlet nozzle which is turned away from the tangential inlet 34 is provided with a series of openings 41 for permitting the air to pass out of the nozzle into the connecting main 42 which leads to the dust separator 43. The top of the nozzle 39 is also provided with a series of openings 44 for facilitating the exit of the air in its passage to the dust separating chamber 43.

The dust collecting or settling chamber 43 may be constructed in accordance with my prior Patent No. 1,109,997 issued September 8th, 1914, or may be of any preferred type, the function thereof being to separate the dust which is carried over from the settling chamber 30. The dust collector 43 is connected by the suction pipe 13 to the blower 11. The grain settling chamber 30 discharges the grain into a feeding device which serves to withdraw the grain from this chamber forming at the same time an air lock. The construction of this feeding device is shown in Fig. 8. The feeding device 45 comprises a main casting 46 which is provided with a flange 47 to secure the same to the flange 40 of the grain separating chamber 30. The main casting 46 is bored out to receive a rotary pocketed carrier 48 shown in dotted lines in Fig. 8. The pocketed carrier 48 is mounted upon a shaft 49 which has bearings in the spider brackets 50, 51, on the front and rear respectively. The gear 52 is mounted upon the front of the shaft 49 and meshes with a worm 53 on the shaft 54 which has bearings at 55 and 56 in the front spider casting 50.

In Fig. 3 I have shown this driving mechanism merely as a pulley 57 secured upon the outer end of the shaft 49 to rotate the pocketed carrier 48. The pulley 57 is connected by means of a belt 58 to a driving pulley 59 upon a suitable counter shaft which is belted to the driving motor 60. From the grain feeder 45 the grain passes down either of the chutes 61 or 62 which may be controlled by suitable pull ropes 64 and 65. The dust separator 43 is provided with a similar device 66 which is also belted to the driving pulley 59 and the motor 60. The dust may be discharged to the chutes 67 or 68 by suitably setting the valve 69.

The above combination of apparatus permits of very rapid handling of loose material such as grain or the like in large quantities and at a relatively low expenditure of power. Due to the relative lightness of a column of air and grain moved in accordance with my invention, the vertical lift which can be secured may be over 200 feet. The horizontal carry may be as great as 2,000 feet and even under such extreme conditions the system constructed in accordance with my invention, will operate at a very great saving of power over systems built in accordance with the prior art in which the grain is pumped rather than the air.

Figure 4:
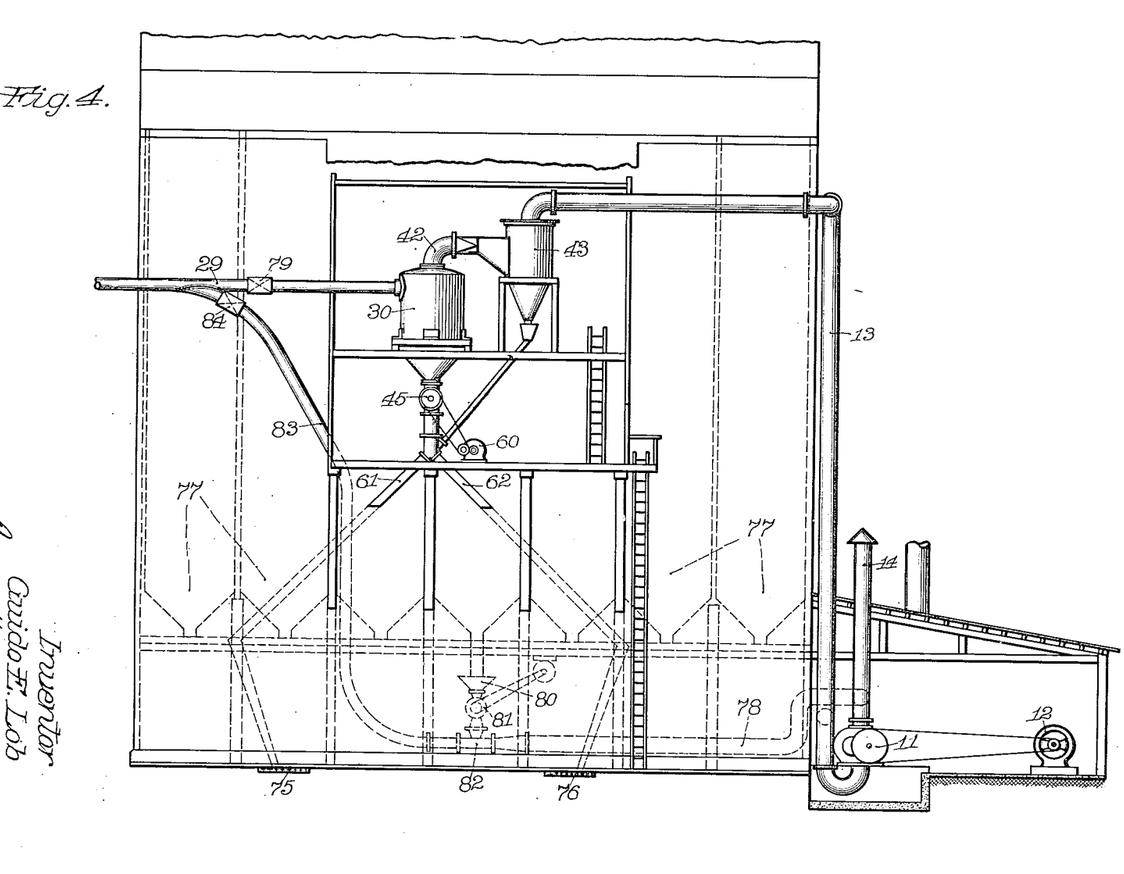
Fig. 4 is a diagrammatic layout for a conveyer system for conveying grain to and from an elevator by suction and by blast respectively.

In Fig. 4 I have illustrated a system for conveying the grain to the elevator by suction and for discharging the same into a boat, car or the like, from the elevator by means of a blast. The grain is drawn through the main 29 to the separating chamber 30 from whence it passes through the air lock 45 to the chute 61 or 62 from whence it is discharged to the mechanical conveyer 75 or 76, and carried by the mechanical conveyers to any one of the bins 77 as may be desired. The connections of the rotary exhauster 11 are such that the same may be used for forcing air into the blast pipe 78 as well as for discharging the same out of the exhaust pipe 14. The suction side of the rotary blower 11 may be disconnected from the suction pipe 13 and opened into the atmosphere when it is desired to discharge a blast of air through the blast pipe 78.

The conveyer main 29 which leads to the separating chamber 30 is provided with a suitable valve 79 when it is desired to use the main 29 for conveying grain from the elevator by blast. One or more of the bins 77 are connected to discharge the grain into the feeding hopper 80 from whence it is fed by the rotary feeder 81 into the blast connection 82 which may be of the type disclosed in my prior Patent No. 1053412 granted February 18th 1913. The blast connection 82 is connected to the main 29 by a pipe 83 which is provided with a suitable valve 84 which is closed when a pipe 29 is employed to convey grain to the separator 30 by suction.

Figure 12:
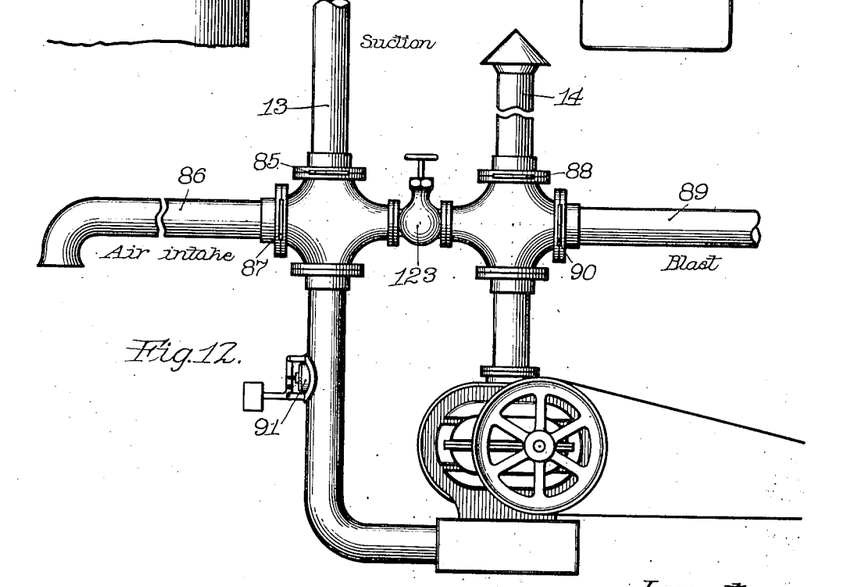
Fig. 12 is a development diagrammatically of the connection for the suction and blast system shown in Fig. 4.

The connections for the rotary air pump 11 are shown in Fig. 12. The suction pipe 13 is provided with a valve 85 and the air intake pipe 86 which opens to the atmosphere is provided with a valve 87. The discharge pipe 14 is also provided with a valve 88 and the blast pipe 89 is provided with a valve 90. When it is desired to convey grain to the separating chamber 30 by suction, the valve 84 in the main 83 is closed, the valve 87 to the air intake 86 is closed, the valve 85 is opened to connect the suction pipe 13 with the rotary blower 11, and on the pressure side of the rotary blower, the valve 88 is opened to permit free discharge to the atmosphere, the valve 90 at this time being closed.

Upon the suction side of the blower 11, a safety valve 91 is provided for preventing damage to the suction pipe in case of clogging.

Figure 11:
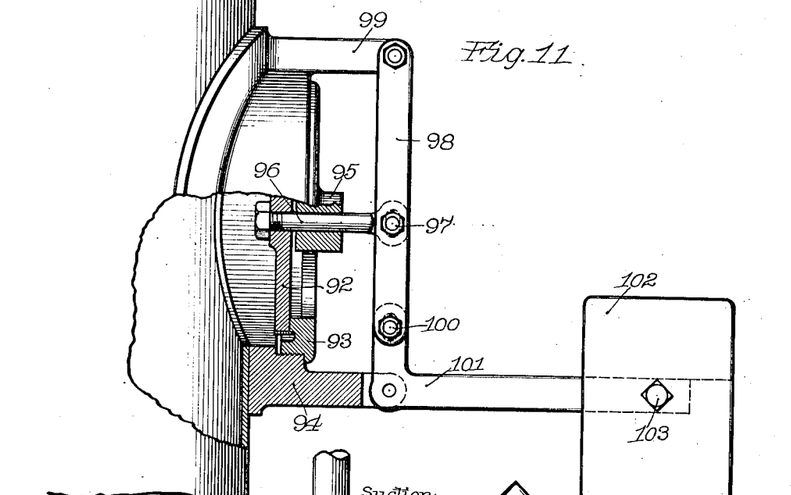
Fig. 11 is a fragmentary view of the relief or safety valve.

This valve 91 is in effect merely a loaded valve which opens upon a predetermined pressure to relieve the pressure upon the suction pipe 13 and the parts connected therewith. Normally the stress upon these parts is very small due to the fact that the air is moving freely in the pipe and no considerable pressure is exerted upon the pipe. In case, however, of clogging of the system, a very considerable pressure may be brought upon these pipes, and to prevent damage to them the valve 91 is set at such a value as to open up and relieve the stress.

This valve consists of a valve disk 92 seated upon a valve seat 93 which is screwed into the frame casting 94. The frame casting is bolted to the side of the suction main, as shown in Figs. 11 and 12.

The seat casting 93 is provided with a spider 95 through the central part of which the valve stem 96 is guided. The end of the valve stem 96 is slotted to work freely on the bolt 97 which is secured to the lever 98. The lever 98 is pivoted at one end to a lug 99 on the main frame casting, and the other end of the lever is pivoted by means of the pin 100 to the short arm of the bell crank lever 101. The outer end of the bell crank lever 101 is provided with a weight 102 which is adjusted by means of the set screw 103 for maintaining the desired pressure upon the valve 92.

Figure 13:
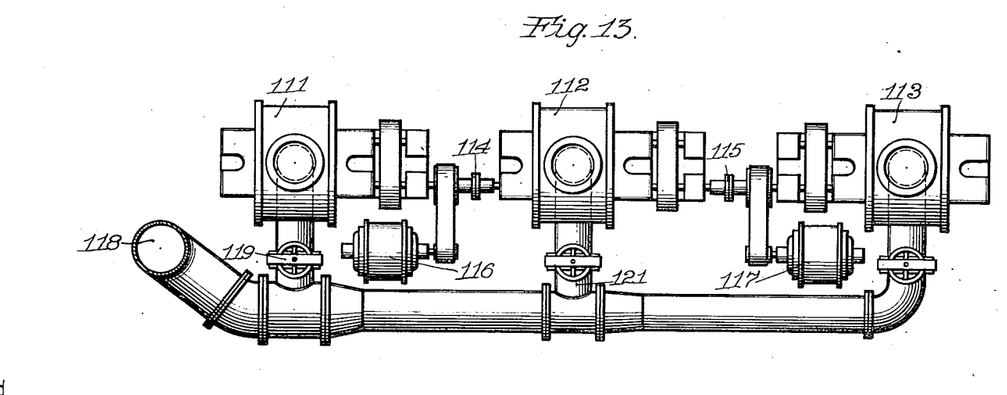
Fig. 13 is a plan view of the rotary exhausters connected to the suction main.
Figure 14:
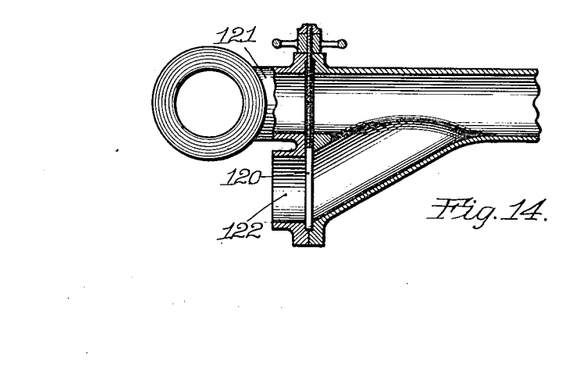
Fig. 14 is a sectional diagrammatic view of the by-pass for each rotary impeller.

I have provided novel means for controlling the quantity of air, that is to say, the degree of suction or blast, so that in case the amount of material to be conveyed is less, as where only a single nozzle is in action, the speed of movement of the air, and the amount of air moved for the grain conveyed may be suitably controlled. Where a number of nozzles are employed, shutting off of a part of these nozzles increases the amount of air that is drawn through the others and at times unfavorably affects their operation by causing too great a speed of the material conveyed and a loss in breakage. If the rotary blowing device is operated by an induction motor it is substantially impossible to decrease the speed of the blowing mechanism to keep pace with the amount of air to be moved. In order to accomplish such graduation of the amount of air moved, I employ a number of blowing machines connected together and exhausting from and into the same pipes. In Fig. 13 I have shown 3 blowers, 111, 112, and 113, connected together by suitable couplings 114 and 115, so that they all rotate in unison. A pair of motors 116 and 117 are belted as by link-belts to the blowers and one or both motors may be employed for driving all of the machines. Where the blowers are employed for suction purposes, the suction side of each machine is connected to the common suction pipe 118 with suitable valve and by-pass mechanism 119 interposed between the individual blower and the common suction main. The suction main 118 is graduated as to size, as is shown in Fig. 13. The valve and by-pass mechanism may be constructed as shown in Fig. 14, in which a valve disk or element 120 is arranged to obstruct either the pipe 121 leading to the common suction main 118 or to obstruct the atmospheric passage 122.

Where it is desired to employ the full capacity of all three machines, the valve mechanism 119 of each one is arranged to close the atmospheric by-pass 122 and to connect the blower with the suction pipe 118.

If it is desired to move a lesser amount of air, the valve disk 120 may be moved to obstruct the connection 121 and to open the atmospheric connection 122. At the same time one of the motors may be shut down and the other motor will carry the load which consists of two machines running under load and one machine running idly. If still less air is required to be moved, another blower may be by-passed and the remaining blower will carry the entire load.

Where it is desired to secure a finer graduation of the amount of air moved, I employ a valve 123, as shown in Fig. 12, between the pressure side of the blower and the suction side of the same. By opening this valve a slight amount, some of the air will be by-passed and circulated thus reducing the amount of air drawn in or delivered. This valve is preferably placed as close as possible to the blower in order to reduce the amount of friction which is caused by thus circulating the air.

In a system employing my method of conveying, such for instance as the typical system shown in Fig. 3, the power consumption for conveying a given amount of material is less than with any of the prior systems with which I am familiar. The amount of power required per ton hour of material conveyed depends greatly upon the length of line, the height of lift, the amount of material carried per hour, and the character of the same. However, suffice it to say that in conveying grain in quantities from twelve hundred to sixteen hundred bushels through a distance of three hundred feet, including a vertical lift of one hundred feet, the expenditure of power is of the magnitude of about one and one-half H. P. per ton hour, and less. The air blower 11 which I have employed in one particular installation is designed to move in the neighborhood of ten thousand cubic feet per minute. The pressure at which it is delivered in the aforementioned case is equivalent to between five and seven inches of mercury. With a blower of the above capacity, five thousand bushels of grain can be moved per hour through a line of about 250 feet length. The capacity of the blower will in general vary between 2,000 and 20,000 cubic feet of air per minute, depending upon the distance carried, the capacity of the installation and the kind of material handled.

It is to be noted that the quantity of air moved is greatly in excess of the quantity of grain by volume, the proportion being of the magnitude of one cubic foot of material to from eighty to one hundred cubic feet of air.

The conveying main 29 is made of large diameter as compared with systems of the prior art in order to reduce the amount of friction of the air with the inside surface of the main, and to permit of a greater volumetric flow of air for a given volume of the material conveyed.

The material is carried along in the conveying main 29 at the rate of from one hundred to one hundred and fifty feet per second until it is discharged into the vacuum tank or grain separator where the velocity of the air drops to about ten feet per second so that the grain may readily be separated.

It is to be understood that my system is designed for continuous operation in that a continuous and fairly uniform stream of material is carried off as distinguished from intermittent feeding of the material.

As above pointed out, the rotary blower in this connection is not the equivalent of a piston pump inasmuch as dust, which would cause wear and excessive power consumption, in a piston pump, is thoroughly innocuous to this type of blower. Furthermore, this type of blower is capable of operation at high speed in order to move large quantities of air at relatively low pressure as distinguished from a piston pump which is adapted to operate at low speed to move small quantities of air at high pressure.

What I claim is:

1. The method of conveying grain in a tubular conveyer which consists in expelling air from the remote end of the tube as fast as it can be supplied at the adjacent end of the tube, and causing the entering air to pick up and raise the grain to be conveyed by friction of the air upon the individual grains, the ratio of grain to air being maintained at one part grain to substantially eighty to one hundred parts of air.

2. The method of conveying grain in a tubular conveyer which consists in continuously passing a current of air at great velocity through said conveyer and causing said current of air to induce by friction individual grains to be conveyed, said current of air being moved at a velocity sufficiently great to pick up and carry the grains at all points in the path independent of the absolute pressure within the tube at a rate of from one hundred to one hundred and fifty feet per second and maintaining the proportion of grain to air at one part of grain to substantially eighty to one hundred parts of air.

In witness whereof, I hereunto subscribe my name this 11th day of February, A. D. 1916.

GUIDO E. LOB.